United States Patent [19]

Hunt

[11] Patent Number: 5,321,339

[45] Date of Patent: Jun. 14, 1994

[54] PROTECTION OF CATHODE RAY TUBES

[75] Inventor: Stuart W. A. Hunt, Hertford, United Kingdom

[73] Assignee: Rank Cintel Limited, England

[21] Appl. No.: 910,278

[22] PCT Filed: Nov. 16, 1990

[86] PCT No.: PCT/GB90/01768

§ 371 Date: Jul. 17, 1992

§ 102(e) Date: Jul. 17, 1992

[87] PCT Pub. No.: WO91/11879

PCT Pub. Date: Aug. 8, 1991

[30] Foreign Application Priority Data

Jan. 19, 1990 [GB] United Kingdom ............. 9001286

[51] Int. Cl.[5] ............ G09G 1/04; H01J 29/70; H04N 5/30; H04N 3/36

[52] U.S. Cl. .................. 315/383; 315/386; 315/367; 348/100; 348/173

[58] Field of Search ............ 315/367, 383, 384, 386; 358/214, 220, 243

[56] References Cited

U.S. PATENT DOCUMENTS 4,198,661 4/1980 Gatten et al. ................ 358/242
4,677,351 6/1987 Brust et al. .................. 315/386
4,722,005 1/1988 Ledenbach .................. 358/168
4,792,733 12/1988 Redfern ...................... 315/386
5,068,647 11/1991 Hinton et al. ................ 315/386

FOREIGN PATENT DOCUMENTS 0234884 9/1987 European Pat. Off. .

OTHER PUBLICATIONS

Patent Abstracts of Japan, vol. 13, No. 581 (E-865) Dec. 21, 1989 & JP, A, 1243674; Sep. 28, 1989.

Primary Examiner—Gregory C. Issing
Attorney, Agent, or Firm—Ostrolenk, Faber, Gerb & Soffen

[57] ABSTRACT

To avoid burn in a scanning cathode ray tube, the address of the scanning spot at each clock period is recorded in a memory. During each frame period, the logarithms of the number of occurrences of each address are fed to a peak detector. The peak value is used to determine a maximum allowable beam current for the next frame. In another embodiment, the number of occurrences of each address during a line period is monitored and if this number exceeds a given number the CRT is blanked.

14 Claims, 2 Drawing Sheets

PROTECTION OF CATHODE RAY TUBES

FIELD OF THE INVENTION

This invention relates to high power cathode ray tubes used for scanning an image. One example of such a CRT is that used in a flying spot telecine in which a film is sequentially scanned by a scanning raster produced by the deflection coils of the CRT.

BACKGROUND TO THE INVENTION

A problem with flying spot telecines and cathode ray tubes in general is burn. This is caused by the flying spot moving too slowly or stopping altogether at a point on the CRT face. The result is that the phosphor on the screen at this point is burnt which seriously degrades the response of that part of the screen.

We have appreciated that there are a number of types of fault or operating conditions which could lead to phosphur burn and which it would be desirable to protect against in high power cathode ray tubes such as telecine flying spot scanners.

A first situation occurs where there is a high concentration of beam energy on a single spot or scan location for a very short time; that is a few microseconds. A second situation is where there is a high concentration of beam energy in certain areas over longer periods of time; that is, a few milliseconds.

SUMMARY OF THE INVENTION

The present invention in its various aspects aims to identify situations where burn might occur and to take action to prevent damage to the CRT face.

In one aspect, the invention monitors the frequency with which a given scan address or scan area is addressed during a scan line and takes action if this exceeds a maximum value. In another aspect the beam current is set according to the frequency with which areas are addressed during a frame.

The invention is defined by the claims to which reference should be made.

The first burn condition mentioned above is likely to be caused by a fault condition where the line scan stops, but could also be caused by particular scan effects which slow the spot or cause it repeatedly to traverse a given scan address. With an EHT voltage of 25 KV and a beam current of 300 uA i.e. a power of 7.5 watts, it has been shown that damage will occur if the tube has not been blanked within 20 uS.

The second condition could happen due to a fault where the frame scan collapses but the line scan still runs. In this case the beam current can remain on for a few frames before damage is likely. 100–200 ms is the maximum time the beam can continue for before burn damage occurs. The second situation can also arise in a continuous motion telecine where the film is being run at a particular range of speeds where the film motion is equal or approximately equal to the frame scan; this is equivalent to a frame collapse. This is permissible if the applicants burn reducing system known as SCANTRACK (TM) is operating but if it were to fail, or the user were to disable the SCANTRACK burn reduction system then protection is required with 100–200 ms. The SCANTRACK burn reduction system reduces burn in continuous motion telecines in which the same area of the CRT faceplate would usually be scanned by the raster. Instead, the raster is slowly moved up and down the CRT face to reduce exposure to the raster at any one location. The movement is compensated for by the servo system and the raster moves with a period of about 2 minutes in the vertical scan direction.

Large concentrations of beam energy which could lead to burn if not controlled can be produced by the use of scan effects. The nature of the concentration is unpredictable but falls in two categories.

The first is similar to a line collapse or partial collapse where the spot stops moving or slows down below a safe velocity for part of the line. This must be protected against within a few uS, preferably 2 uS.

The second category is similar to a frame collapse where parts of the tube face are being scanned many times. This condition, like the second condition described above is permissible if SCANTRACK (TM) is operating but the uses may disable scantrack. Moreover, SCANTRACK (TM) does not operate when the film is stationary.

In a preferred embodiment of the invention the first condition whether caused by equipment malfunction or scan effects is avoided by a system in which the number of times a given horizontal scan location is addressed during a line duration is measured, and, if it exceeds fifteen the CRT is blanked. Preferably, if the horizontal (X) address exceeds fifteen the vertical address is then monitored and tube blanking is performed only if both exceed the safe level.

The second condition, whether produced by equipment malfunction or by scan effects, may be avoided by the system of a further preferred embodiment in which the number of times a given scan area, defined by the most significant bits of the X and Y scan co-ordinates is addressed, is measured. This measurement is used to determine the maximum allowable beam current for that area.

BRIEF DESCRIPTION OF DRAWINGS

Embodiments of the invention will now be described, by way of example, with reference to the accompanying drawings, in which.

DESCRIPTION OF PREFERRED EMBODIMENTS

Figure 1:
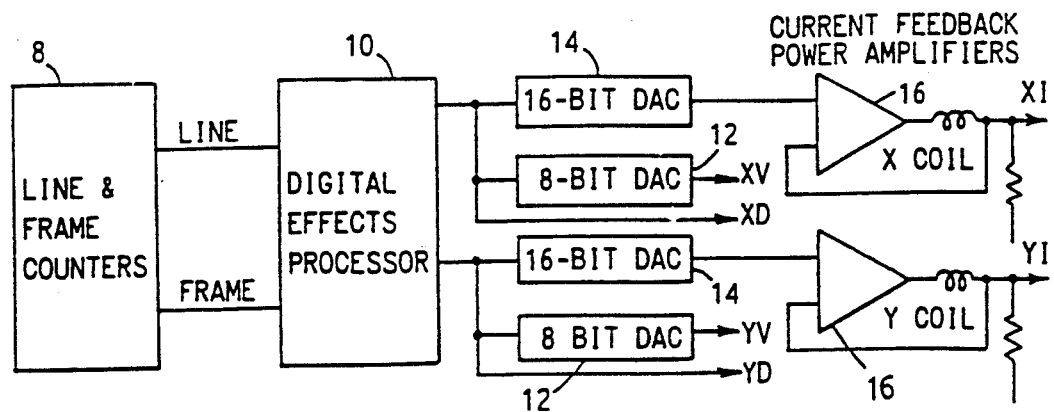
FIG. 1 shows, in block form, how the X and Y coils of a CRT are controlled.

The block diagram shown in FIG. 1 is of the applicant's URSA flying spot telecine scanning system. Line and frame counts are provided to a digital effects processor 10 from counters 8. The output of the digital effects processor is a series of digital X and Y address XD and YD.

The signal XD and YD are each passed through low resolution 8 bit D to A convertors 12 to produce horizontal and vertical voltage signals HV and YV and through 16 bit D to A convertors 14 to provide inputs to current feedback control amplifiers 16 which control the X deflection and Y deflection coil currents XI and YI.

The tube burn protection to be described, is derived from the digital signals XD and YD. This means that there is no protection for the D to A convertors and the power amplifiers. However, by using the separate low resolution (8 bit) D to A convertors 12 and comparing the outputs XV, YV of these with the deflection coil currents XI, YI, faults in the high resolution 16 bit D to A convertors 14 can be detected easily using a few comparators only (not shown).

Figure 2:
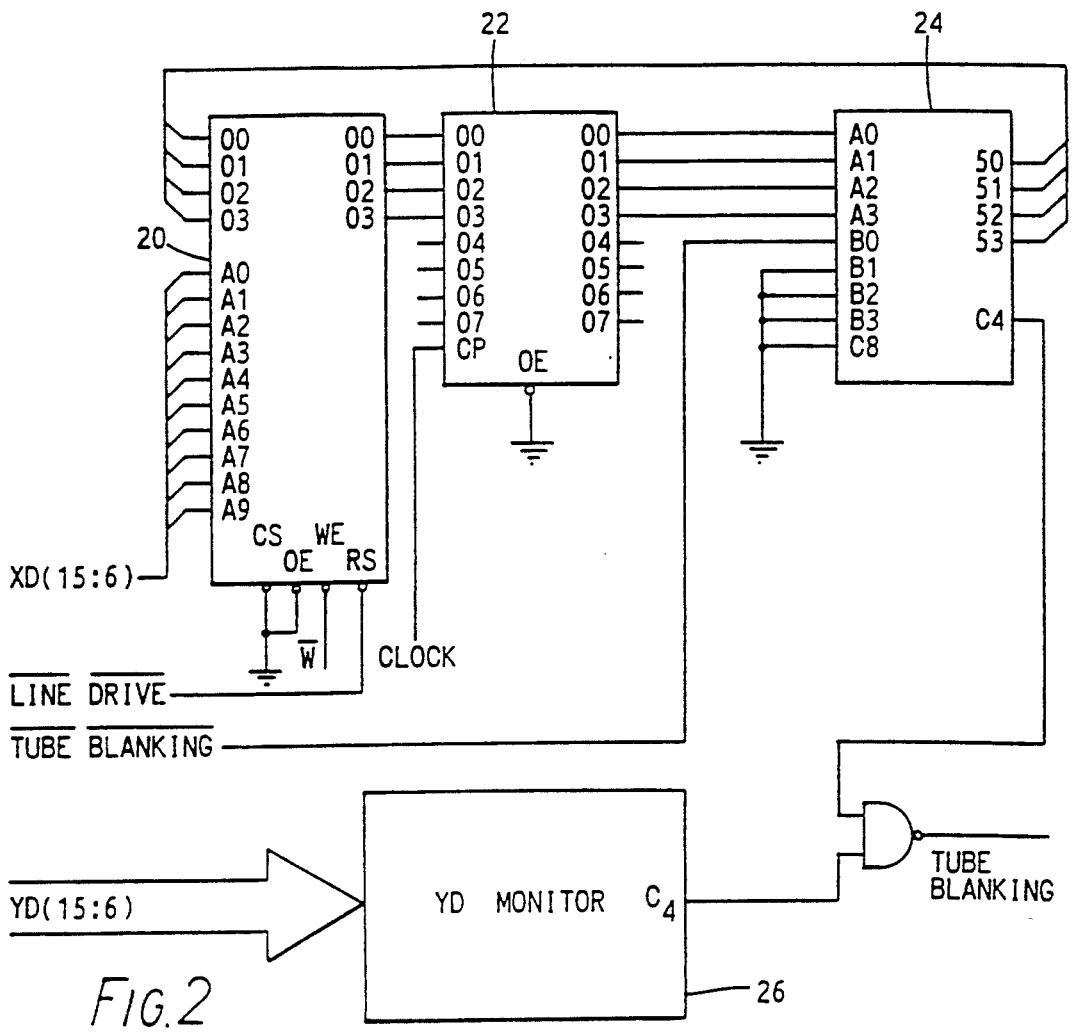
FIG. 2 shows a first embodiment of the invention for avoiding burn caused by excessive beam energy over a short time period.

FIG. 2 shows a circuit which can monitor the spatial beam energy over a short time scale, i.e. one scan line. If the concentration of energy exceeds a safe level due to low or zero scanning velocity, action must be taken within 2 uS to prevent burn of the CRT phosphor.

The 16 bit digital X signal XD from the digital effects processor 10 in FIG. 1 is used to monitor the dwell time of the spot. The 10 most significant bits of the signal form address inputs A0 to A9 of RAM 20 on the write cycle of the RAM 20, which is controlled by state of read/write pin WE. The four bit output 00 to 03 of the memory location addressed by the 10 most significant bits of the digital X signal (XD 15:6) is placed on data inputs D0 to D3 of latch 22. On clocking the latch these data are placed on the A0 to A3 inputs of adder 24. Inputs B1 to B3 and carry C0 of the adder are tied low and input B0 is held high except when the cathode ray tube is being blanked. Thus, unless tube blanking occurs, the four bit number held at the addressed location in RAM 20 is incremented by one. The new value from the adder is placed on outputs S0 to S3 and fed back to the data inputs of RAM 20 which reads the new four bit number on the next read cycle.

In the case where the addressed location holds 1111 the addition of a further 1 will cause a carry to be placed on carry output C4 of the adder 24. This indicates that this is the sixteenth time the memory location has been addressed during the particular line scan and that the spot is either stationary or moving too slowly for safety. The tube must be blanked immediately unless the spot is moving fast enough in the Y axis for there to be no risk of burn.

An identical circuit is provided to monitor the digital YD circuit and this is indicated in block form at 26. The outputs of adder 24 and the respective YD adder of circuit 26 form the inputs of NAND gate 30. When both inputs are high gate 30 will give a low output which will immediately trigger the tube blanking.

The reset pins of the horizontal XD and vertical YD RAMS are both tied to the line drive so that each is reset at the end of each line. In addition, as there is no need for any remedial action to be taken during tube blanking the B0 input of the respective adders is tied to a tube blanking signal. Thus, when tube blanking occurs the locations will not be incremented when they are addressed.

Figure 3:
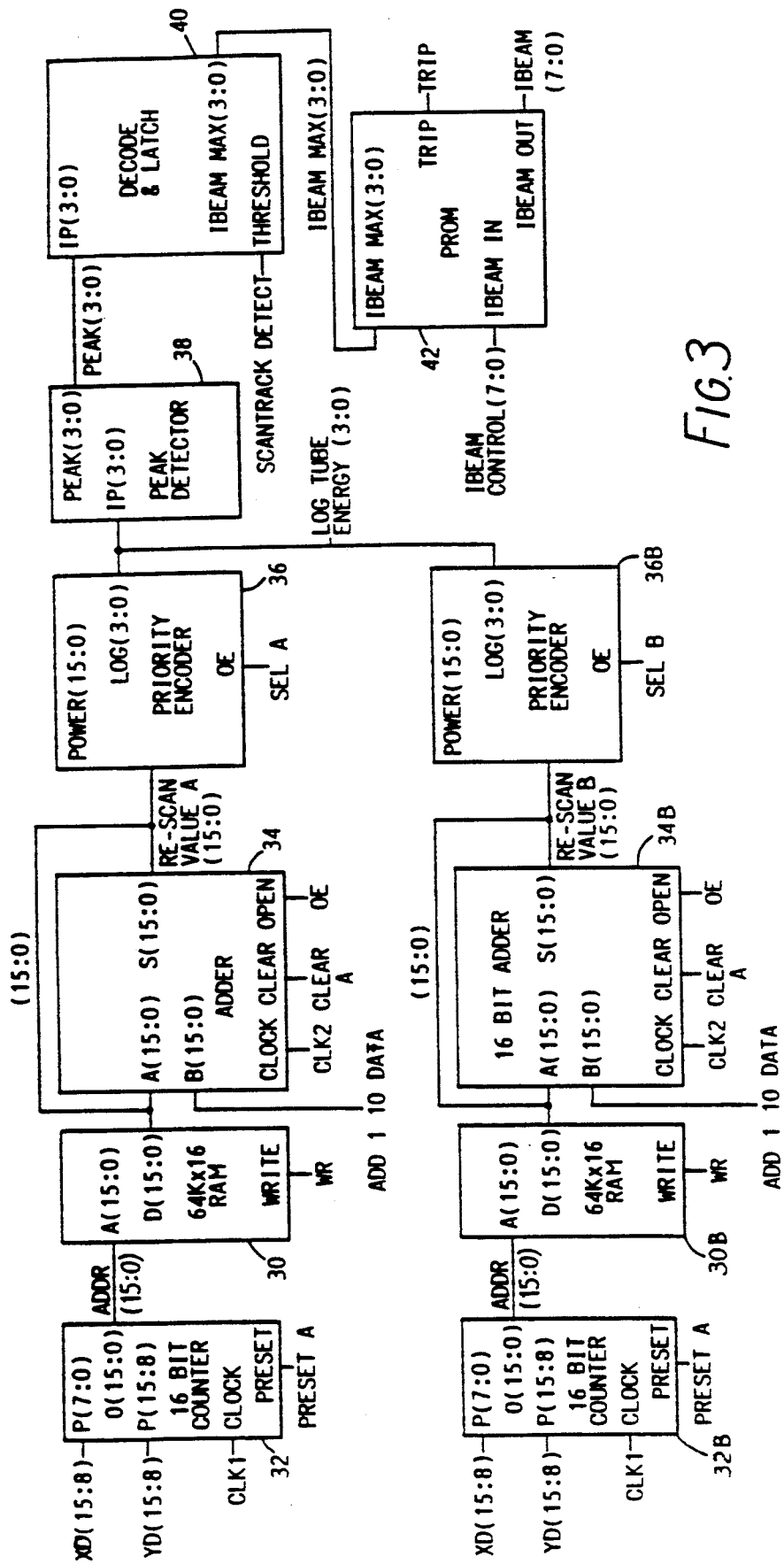
FIG. 3 shows a second embodiment of the invention for avoiding burn caused by excessive beam energy over a longer period.

FIG. 3 shows a circuit which gives longer term protection against CRT burn; that is the spatial beam energy is monitored over the whole frame and action is taken if the number of times any particular part of the CRT face is re-scanned exceeds a safe level. This level is dependent on whether SCANTRACK (TM) is operational and also on the beam current setting. In the latter case the higher the beam current the lower the acceptable number of re-scans during any given frame. The circuit protects the CRT by taking action during the next frame, either by turning the beam current off or by reducing the current to a safe level.

In FIG. 3, the 8 most significant bits of the digital X and Y addresses (XD 15:8 and YD 15:8) are fed to the address bus of a 64K sixteen bit word RAM 30 via a counter 32 held in preset mode. The counter serves to assemble the XD and YD inputs into the correct format for the address bit of memory 30; the 8 bit XD input being placed onto inputs P0 to P7 of counter 32 and the 8 bit YD input being placed on input P8 to P15.

Each time a given memory location of RAM 30 is addressed, the 16 bit word held at that address is placed on the A input of 16 bit adder 34 and is added with the B inputs which comprise 15 bits held low and a logical 1 on the least significant bit B0. Thus, the data is incremented by 1. The new data is fed back to the memory 30 and stored at the respective location on the next write cycle.

The combination of counter 32, RAM 30 and adder 34 gives a measure of how many times a given area of CRT phosphor has been scanned during one frame. At the end of the frame, during blanking, the memory is cleared. However, the blanking interval is not long enough for the memory to be cleared completely and so a second identical circuit 30B, 32B and 34B is provided which performs exactly the same function as the circuit described while that circuit is being cleared. Similarly, circuit B is cleared while circuit A is operating. In both circuits clearing of the RAMs is performed by cycling the address with the counter 32 and writing zeros from the cleared 16 bit adder.

The output of the operational 16 bit adder is fed to a 16 to 4 line priority encoder 36, 36B which forms a 4 bit log signal of the spatial concentration of the tube energy. The encoders are provided with output enables to allow multiplexing between the two circuits. Encoder 36A is enabled by a select A signal and encoder 36B is enabled by a select B signal.

As a two-fold increase in spatial concentration will only increment the four bit output of the encoder by one, a large dynamic range of tube energy concentration can be handled with just four bits of data.

The output of the selected priority encoder is fed to a peak detector 38. The peak concentration during the current frame is output as a four bit signal to a decode and latch circuit 40. This peak value is used for the next frame and, along with a signal from a scantrack detection circuit, is latched to form a signal representative of the maximum permissible beam current. This maximum current, I Beam Max forms the four bit data input to a PROM 42 whose address is an 8 bit beam control signal. The 8 bit output of the PROM is the actual beam current although a trip output is provided which shuts the tube down i.e. the energy concentration is made too high.

Thus the embodiments described provide control of the flying spot beam to prevent burn at two levels. Firstly, within a short time scale such as one scan line a circuit is provided which allows the tube blanking to be enabled very quickly (within 2 uS) if the spot is travelling too slowly or is stationary.

Secondly, the spatial concentration of energy over the CRT face during each frame is monitored so that, if necessary, the beam current can be reduced or, in extreme cases, the tube shut down. The latter circuit is not required to take action so quickly and will react one frame after the excessive energy concentrations are measured; that is within the 100–200 mS necessary to prevent damage.

The embodiments described above are examples only and other implementations of the invention are possible. In the circuit of FIG. 3 the need for two RAMs operating alternately can be avoided if a RAM is used which can be cleared completely during the blanking interval.

Such a memory function is available using an ITD 7165 (S55) 8K x 8RAM. As this device has a reset pin, adder 34 is no longer necessary and may be replaced by a 16 bit counter.

I claim:

1. Apparatus for regulating a high power cathode ray tube (CRT) scanner to avoid burn, comprising means for generating horizontal and vertical digital addresses for each location scanned by the CRT spot, means for monitoring a measure of the duration for which each location or group of locations is addressed during a given period and comprising a random access memory, the storage locations of which are addressed by digital words representing areas of the CRT face, and means for incrementing the value stored at each location each time the respective area is addressed, and means for determining a peak value of the energy concentration during the given period, means for determining the maximum permissible beam current from the peak value and means for varying the beam current for the next given period if the actual beam current is greater than the maximum permissible beam period.

2. Apparatus according to claim 1 wherein the means for determining the peak value of the energy concentration comprises means for taking the logarithms of the contents of the locations of the memory and means for determining the peak value from the logarithmic values.

3. Apparatus according to claim 1, comprising means for clearing the memory at the end of each given period, the clearing means comprising means for clearing the adder to hold a zero output and means for writing the zero output of the adder sequentially into each location of the memory.

4. Apparatus according to claim 3, comprising a further random access memory, adder and writing means for monitoring the number of times each location or group of locations is addressed which the previous means is cleared.

5. Apparatus according to claim 1, wherein said period is a frame period.

6. Apparatus for regulating a cathode ray tube (C.R.T.) scanner to avoid phosphur burn, comprising means for generating a set of digital addresses for each location to be scanned by the C.R.T., scanning means for scanning the face of the C.R.T. in accordance with the set of addresses generated, scanning addresses being supplied to the scanning means at a predetermined frequency, means for monitoring the number of times a given scan location or group of locations is addressed during a given scanning interval, and means for adjusting the power of the scanning spot for the next scanning interval in accordance with a function of duration for which any given location or group of locations was addressed during the said given scanning interval.

7. Apparatus for regulating a cathode ray tube scanner to avoid burn, comprising means for generating horizontal and vertical digital addresses for each location scanned by the CRT spot, means for monitoring the number of times one of the horizontal or vertical coordinates of a location is addressed during a given period and including first signal generation means for generating a signal when the one coordinate is addressed more than a given number of times during said given period, means for monitoring the number of times the other of the horizontal and vertical coordinates is addressed, second signal generation means for generating a signal when the other coordinates is addressed more than a given number of times during said given period, and the means for blanking the CRT when both the first and second signal generation means generate said signals.

8. Apparatus according to claim 7, wherein the given period is substantially equal to the time taken to scan one line.

9. Apparatus according to claim 7, wherein the monitoring means comprises a random access memory having at least n address inputs where $2^n-1$ is greater or equal to the number of horizontal or vertical addresses, and means for incrementing a value stored at each address each time the address is put on the address bus.

10. Apparatus according to claim 9, wherein the first and second signal generating means each comprises means arranged to add to the stored value of a memory location when that location is addressed an incremental value to form a new value, to write the new value at the memory location and to generate the said signal as a carry signal when the new value exceeds a given value.

11. Apparatus according to claim 10, wherein the said signal is generated when a location is addressed for the sixteenth time during the given period.

12. Apparatus for regulating a cathode ray tube (CRT) scanner to avoid burn, comprising means for generating a set of digital addresses for each location scanned by the CRT spot, means for recording a measure of the duration for which each location or group of locations is addressed by the address generation means during a video line period, means for blanking the CRT as soon as the number of times a location or group of locations is addressed exceeds a predetermined allowable number, the CRT blanking means operating for the remainder of the video line, and means for resetting the recording means after each video line so that the measure of duration recorded for any given line is independent of the measure of duration recorded on any previous video line.

13. Apparatus according to claim 12, wherein the recording means comprises a memory device having a unique address location for each location or group of locations, means for incrementing a value stored at the relevant address location each time a location or group of locations is addressed, means for generating a blanking signal when the stored value corresponding to a location or group of location exceeds a predetermined allowable number, and means for clearing the values stored at each memory address location corresponding to a scan address at the end of each video scan line period.

14. Apparatus according to claim 2, comprising means for clearing the memory at the end of each given period, the clearing means comprising means for clearing the adder to hold a zero output and means for writing the zero output of the adder sequentially into each location of the memory.

* * * * *